United States Patent
Lopez et al.

(10) Patent No.: US 9,174,151 B2
(45) Date of Patent: Nov. 3, 2015

(54) POROUS MEDIUM SCREEN

(71) Applicant: Halliburton Energy Services, Inc., Houston, TX (US)

(72) Inventors: Jean-Marc Lopez, Plano, TX (US); Liang Zhao, Carrollton, TX (US); Luke William Holderman, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/016,479

(22) Filed: Sep. 3, 2013

(65) Prior Publication Data

US 2014/0000871 A1 Jan. 2, 2014

Related U.S. Application Data

(63) Continuation of application No. 13/994,030, filed as application No. PCT/US2012/039841 on May 29, 2012.

(51) Int. Cl.
*E21B 43/00* (2006.01)
*E03B 3/18* (2006.01)
*B01D 35/28* (2006.01)
*E21B 41/00* (2006.01)

(52) U.S. Cl.
CPC ............... *B01D 35/28* (2013.01); *E21B 41/00* (2013.01)

(58) Field of Classification Search
CPC ..... E21B 43/08; E21B 43/108; E21B 43/088; E21B 43/082; E21B 43/086; E21B 41/00; E03B 3/18; B01D 35/28
USPC .......................................... 166/227, 228, 236
See application file for complete search history.

(56) References Cited

U.S. PATENT DOCUMENTS

| | | | | |
|---|---|---|---|---|
| 2,391,609 A | * | 12/1945 | Wright | 166/228 |
| 3,302,999 A | * | 2/1967 | Mitchell | 423/448 |
| 3,322,199 A | * | 5/1967 | Van Note, Jr. | 166/205 |
| 4,504,391 A | | 3/1985 | Weems, Sr. | |
| 6,513,588 B1 | * | 2/2003 | Metcalfe | 166/89.2 |

(Continued)

OTHER PUBLICATIONS

International Patent Application No. PCT/US2012/039841, "International Search Report and Written Opinion", mailed Feb. 22, 2013, 11 pages.

(Continued)

*Primary Examiner* — Kenneth L Thompson
*Assistant Examiner* — Michael Wills, III
(74) *Attorney, Agent, or Firm* — Kilpatrick Townsend & Stockton LLP (57) ABSTRACT

Certain aspects of the present invention are directed to a porous medium screen that can be disposed in a wellbore through a fluid-producing formation. The porous medium screen can include a porous medium and a retaining structure. The porous medium can be a material having one or more pores. The pores can be adapted to allow a fluid to flow through the porous medium and to prevent particles from flowing through the porous medium. The retaining structure can be adapted to retain the porous medium in a position circumferentially surrounding a section of a tubing string and to prevent expansion of the porous medium. The retaining structure can include a shroud and one or more stoppers. The shroud can be adapted to circumferentially surround the porous medium. Each stopper can be adapted to circumferentially surround the section of a tubing string at an edge of the porous medium.

7 Claims, 8 Drawing Sheets

(56) References Cited

U.S. PATENT DOCUMENTS

| | | | |
|---|---|---|---|
| 6,561,732 B1* | 5/2003 | Bloomfield et al. | 405/43 |
| 6,571,871 B2 | 6/2003 | Lauritzen et al. | |
| 7,048,048 B2* | 5/2006 | Nguyen et al. | 166/227 |
| 7,258,166 B2* | 8/2007 | Russell | 166/229 |
| 7,299,869 B2* | 11/2007 | Kalman | 166/276 |
| 7,475,729 B2* | 1/2009 | Johnson | 166/305.1 |
| 7,673,678 B2* | 3/2010 | MacDougall et al. | 166/228 |
| 7,793,714 B2* | 9/2010 | Johnson | 166/205 |
| 7,842,124 B2* | 11/2010 | Partridge et al. | 95/50 |
| 7,861,787 B2* | 1/2011 | Russell | 166/310 |
| 7,926,565 B2* | 4/2011 | Duan et al. | 166/278 |
| 8,011,432 B2* | 9/2011 | Langlais et al. | 166/278 |
| 8,377,840 B2* | 2/2013 | Seals et al. | 502/259 |
| 8,414,805 B2* | 4/2013 | Wang | 264/29.6 |
| 8,430,158 B2* | 4/2013 | Holderman et al. | 166/227 |
| 8,528,640 B2* | 9/2013 | Agrawal | 166/276 |
| 2007/0090047 A1* | 4/2007 | Bell et al. | 210/510.1 |
| 2007/0281162 A1* | 12/2007 | Matviya | 428/408 |
| 2008/0006402 A1* | 1/2008 | Russell | 166/229 |
| 2008/0087431 A1* | 4/2008 | Willauer et al. | 166/290 |
| 2009/0084556 A1 | 4/2009 | Richards et al. | |
| 2009/0136809 A1* | 5/2009 | Wang | 429/27 |
| 2009/0218101 A1* | 9/2009 | Langlais et al. | 166/313 |
| 2011/0067872 A1* | 3/2011 | Agrawal | 166/302 |
| 2011/0073296 A1 | 3/2011 | Richard et al. | |
| 2011/0180257 A1* | 7/2011 | Scott et al. | 166/276 |
| 2011/0265990 A1* | 11/2011 | Augustine et al. | 166/230 |
| 2011/0315226 A1* | 12/2011 | Xu et al. | 137/1 |
| 2012/0152528 A1* | 6/2012 | Greci | 166/227 |
| 2012/0186819 A1* | 7/2012 | Dagenais et al. | 166/310 |
| 2013/0206393 A1* | 8/2013 | Kuo et al. | 166/227 |
| 2014/0034324 A1* | 2/2014 | Lopez | 166/316 |

OTHER PUBLICATIONS

U.S. Appl. No. 13/994,030, Non-Final Office Action, mailed Feb. 28, 2014, 11 pages.

U.S. Appl. No. 13/994,030, Final Office Action mailed on Jun. 3, 2014, 14 pages.

U.S. Appl. No. 13/994,03 Applicant-Initiated Interview Summary mailed on Aug. 25, 2014, 6 pages.

U.S. Appl. No. 13/994,030, Non-Final Office Action mailed Sep. 12, 2014, 6 pages.

U.S. Appl. No. 13/994,030, Final Office Action mailed on Jan. 14, 2015, 8 pages.

Australian Patent Application No. 2012381087, First Examination Report mailed Jun. 30, 2015, 3 pages.

Singapore Patent Application No. 11201406519Q, Written Opinion mailed Jun. 8, 2015, 6 pages.

* cited by examiner

POROUS MEDIUM SCREEN

CROSS-REFERENCE TO RELATED APPLICATIONS

This is a continuation of U.S. application Ser. No. 13/994,030, filed Jun. 13, 2013, which is a U.S. national phase under 35 U.S.C. 371 of International Patent Application No. PCT/US2012/039841 filed May 29, 2012, each of which is incorporated herein by reference in its entirety.

TECHNICAL FIELD OF THE INVENTION

The present invention relates generally to devices for sand control during production of fluid from a wellbore in a subterranean formation and, more particularly (although not necessarily exclusively), to porous medium screens that can filter particulate material from formation fluids in producing wells.

BACKGROUND

Particulate materials, such as sand, may be produced during the production of hydrocarbons from a well system traversing a subterranean formation. A well system can include devices and procedures for sand control. The production of sand can restrict productivity, erode components of the well system, impede wellbore access, interfere with the operation of downhole equipment, and present disposal difficulties. Sand control can include preventing sand, silt, or other particles from a subterranean formation from entering a wellbore or near-wellbore area of a well system. Sand control can reduce or prevent the migration of sand and other particles into the near wellbore area that may restrict production of fluids from the subterranean formation. In some subterranean formations, sand control can help maintain the structure of a reservoir of fluid around the wellbore in the subterranean formation.

It is desirable to prevent the production of particulate materials from a well that traverses a hydrocarbon bearing subterranean formation.

SUMMARY

In some embodiments, a porous medium screen is provided that can be disposed in a wellbore through a fluid-producing formation. The porous medium screen can include a porous medium, such as a foam, and a retaining structure. The porous medium can be a material that includes one or more pores. The one or more pores can be adapted to allow a fluid to flow through the porous medium and to prevent one or more particles from flowing through the porous medium. The retaining structure can be adapted to retain the porous medium in a position circumferentially surrounding a section of a tubing string. The retaining structure can be further adapted to prevent radial expansion of the porous medium or axial expansion of the porous medium.

These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Certain aspects and embodiments of the present invention are directed to a porous medium screen that can be disposed in a wellbore through a fluid-producing formation. The porous medium screen can include a porous medium, such as a metallic foam or other foam. The porous medium can include pores of a sufficient diameter to prevent or obstruct particles in production fluid from a subterranean formation from entering a section of a tubing string in a well system and to allow the production fluid to flow into the tubing string. A retaining structure, such as a rigid shroud, can prevent the porous medium from expanding. The use of a porous medium constrained by a retaining structure preventing expansion of the porous medium can provide a simpler and less costly sand control solution as compared to, for example, expandable sand screen assemblies using a series of metallic mesh filtration layers formed from impermeable materials.

The porous medium screen can include a porous medium with one or more pores. The porous medium can be, for example, a cellular structure that includes a continuous material having a series of pores. The continuous material can provide a frame in which pores can be located. A pore can be an empty space within the continuous material. Examples of the porous medium can include, but are not limited to, a solid material or a foam. The pores can interconnect such that the pores form a series of channels through the porous medium such that fluid or other materials can move through the material. The series of channels formed by the pores and the frame provided by the continuous material can be continuous so as to form two interpenetrating continua.

The pores of the porous medium can be adapted to allow a fluid to flow through the porous medium and to prevent particles from flowing through the porous medium. Examples of a porous medium can include (but are not limited to) a carbon foam, a silicone foam, a silicone carbide foam, a metal foam, a polyester foam, a polyurethane foam, an epoxy having dissolvable porous medium, a silicon carbon foam, etc.

The porosity of a porous medium can be varied based on the expected particle size of a particle to be screened and a viscosity of a production fluid in a given subterranean formation. The term "porosity" can refer to a measurement of the pores in a material expressed as a fraction of the volume of empty spaces over the total volume. The average size of the pores in a porous medium can also be varied. One example of a porous medium is a metal foam with a porosity wherein 75-95% of the volume of the metal foam includes empty spaces and with an average pore size of 5-10 millimeters. Another example of a porous medium is a carbon foam with a porosity wherein 3% of the volume of the metal foam includes empty spaces and with an average pore size of 0.1 millimeters.

The viscosity of the production fluid can be the resistance of the production fluid to movement or flow. For example, heavy crude oil may have a high viscosity greater than ten centipoise. A porous medium can be selected and/or manufactured to have a porosity and an average pore size such that the viscosity of the production fluid produced from a subterranean formation does not prevent the production fluid from flowing through the porous medium. A porous medium can be selected and/or manufactured to have a porosity and an average pore size such that particles in a production fluid are prevented from flowing through the porous medium. The porosity and average pore size of the porous medium can be varied based on the characteristics of the subterranean formation in which the porous medium screen may be deployed, such as the average diameter of sand particles encountered in the formation.

The porous medium screen can be configured to be coupled to a section of a tubing string. The porous medium screen can be installed with the section of the tubing string in a well system.

The porous medium screen can include a retaining structure. The retaining structure can retain the porous medium in a position circumferentially surrounding a section of a tubing string. The retaining structure can prevent the porous medium from expanding in one or more of a radial direction or an axial direction. The porous medium expanding in a radial direction can include the porous medium expanding in a direction from an outer diameter of a tubing string to the subterranean formation. The porous medium expanding in an axial direction can include the porous medium expanding in a direction substantially parallel to the orientation of a tubing string in a wellbore. The retaining structure can be configured to be attached or otherwise coupled to a section of a tubing string such that the retaining structure remains attached to the section of the tubing string disposed in a wellbore through the fluid-producing formation. In some embodiments, attaching or otherwise coupling the retaining structure to the section of a tubing string can prevent the retaining structure from being removed from the porous medium screen, thereby permanently preventing the porous medium from expanding.

The retaining structure can include a shroud. The shroud can be adapted to circumferentially surround the porous medium. The shroud can include a series of strands adapted to be coupled to one another. Each of the strands can be formed from any suitable non-permeable and rigid or semi-rigid material, such as a metal. The strands of the shroud can be spaced so as to allow fluids and particles to pass through the spaces between the strands. The shroud can prevent the porous medium from expanding in a radial direction. The shroud can protect the porous medium during deployment. The shroud can also protect the porous medium coupled to a tubing section being moved or otherwise manipulated in a wellbore system. Protecting the porous medium can include preventing damage to the porous medium during insertion or manipulation of a section of a tubing string into a wellbore. The shroud can be a solid material having openings allowing fluid and particles to flow through the shroud.

The retaining structure can also include one or more stoppers. A stopper, such as a ring, can be adapted to circumferentially surround a section of a tubing string. The stopper can be formed using any suitable material, such as a non-permeable and rigid or semi-rigid material. Examples of suitable materials include, but are not limited to, rubber, metal, plastic, etc. A stopper can be placed at one or more edges of a section of the porous medium to prevent the movement of the porous medium along the tubing string. The stopper can prevent the porous medium from expanding in an axial direction.

These illustrative examples are given to introduce the reader to the general subject matter discussed here and are not intended to limit the scope of the disclosed concepts. The following sections describe various additional embodiments and examples with reference to the drawings in which like numerals indicate like elements, and directional descriptions are used to describe the illustrative embodiments but, like the illustrative embodiments, should not be used to limit the present invention.

Figure 1:
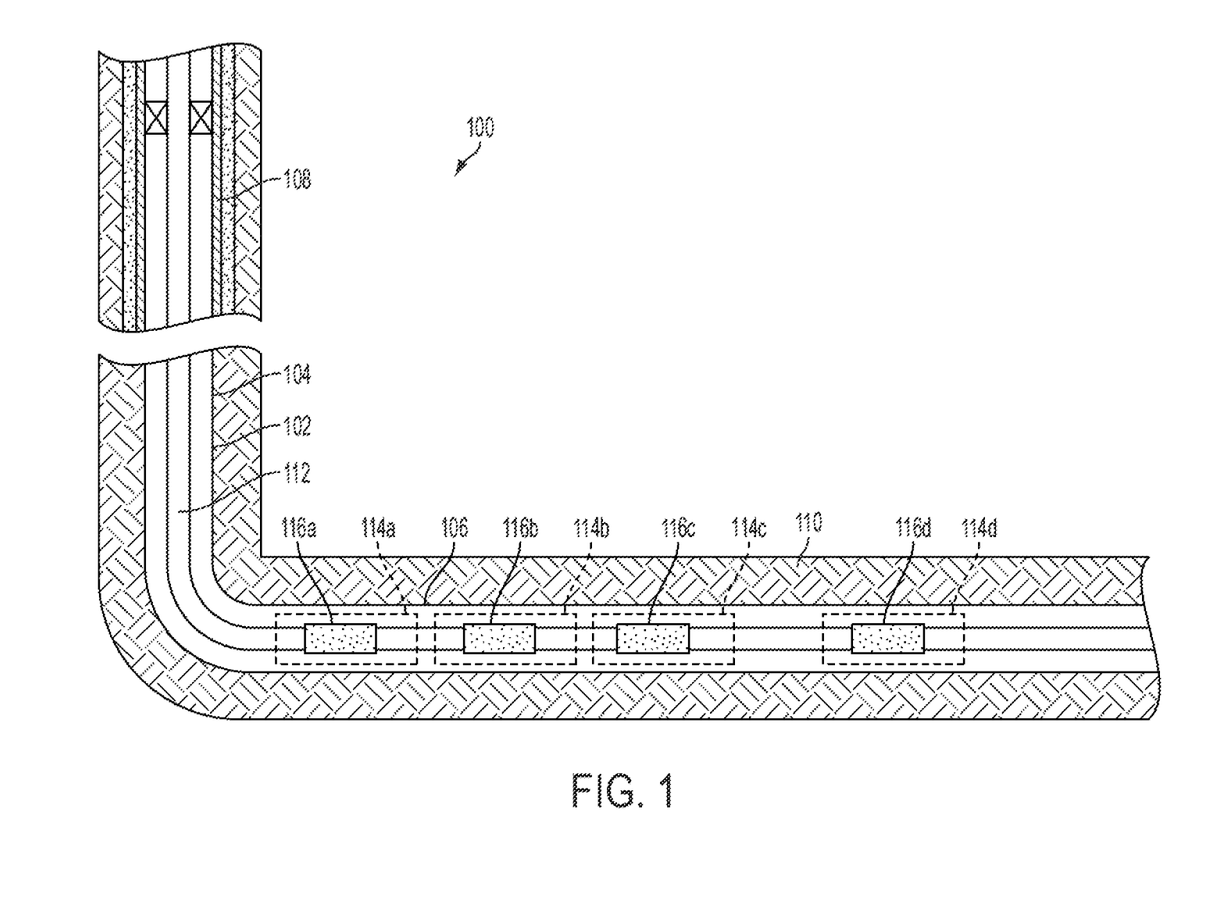
FIG. 1 is a schematic illustration of a well system having a porous medium screen according to one embodiment of the present invention.

FIG. 1 schematically depicts a well system 100 having a tubing string 112 with porous medium screens 116a-d according to certain embodiments of the present invention. The well system 100 includes a bore that is a wellbore 102 extending through various earth strata. The wellbore 102 has a substantially vertical section 104 and a substantially horizontal section 106. The substantially vertical section 104 and the substantially horizontal section 106 may include a casing string 108 cemented at an upper portion of the substantially vertical section 104. The substantially horizontal section 106 extends through a hydrocarbon bearing subterranean formation 110.

The tubing string 112 within wellbore 102 extends from the surface to the subterranean formation 110. The tubing string can include one or more tubing sections 114a-d. The tubing string 112 can provide a conduit for formation fluids, such as production fluids produced from the subterranean formation 110, to travel from the substantially horizontal section 106 to the surface. Pressure from a bore in a subterranean formation can cause formation fluids, including production fluids such as gas or petroleum, to flow to the surface.

The well system 100 can also include one or more porous medium screens 116a-d. Each of the porous medium screens 116a-d can be coupled to a respective tubing section 114a-d of the tubing string 112 at a horizontal section 106. The porous medium screens 116a-d can filter particulate materials of a predetermined size from the production fluid of the subterranean formation 110 as the production fluid flows into the tubing sections 114a-d.

Although FIG. 1 depicts the porous medium screens 116a-d positioned in the substantially horizontal section 106, a porous medium screen can be located, additionally or alternatively, in the substantially vertical section 104. In some embodiments, porous medium screens can be disposed in simpler wellbores, such as wellbores having only a substantially vertical section. Porous medium screens can be disposed in openhole environments, such as is depicted in FIG. 1, or in cased wells.

Although FIG. 1 depicts four porous medium screens 116a-d positioned in the tubing string 112, any number of porous medium screens can be used.

Figure 2:
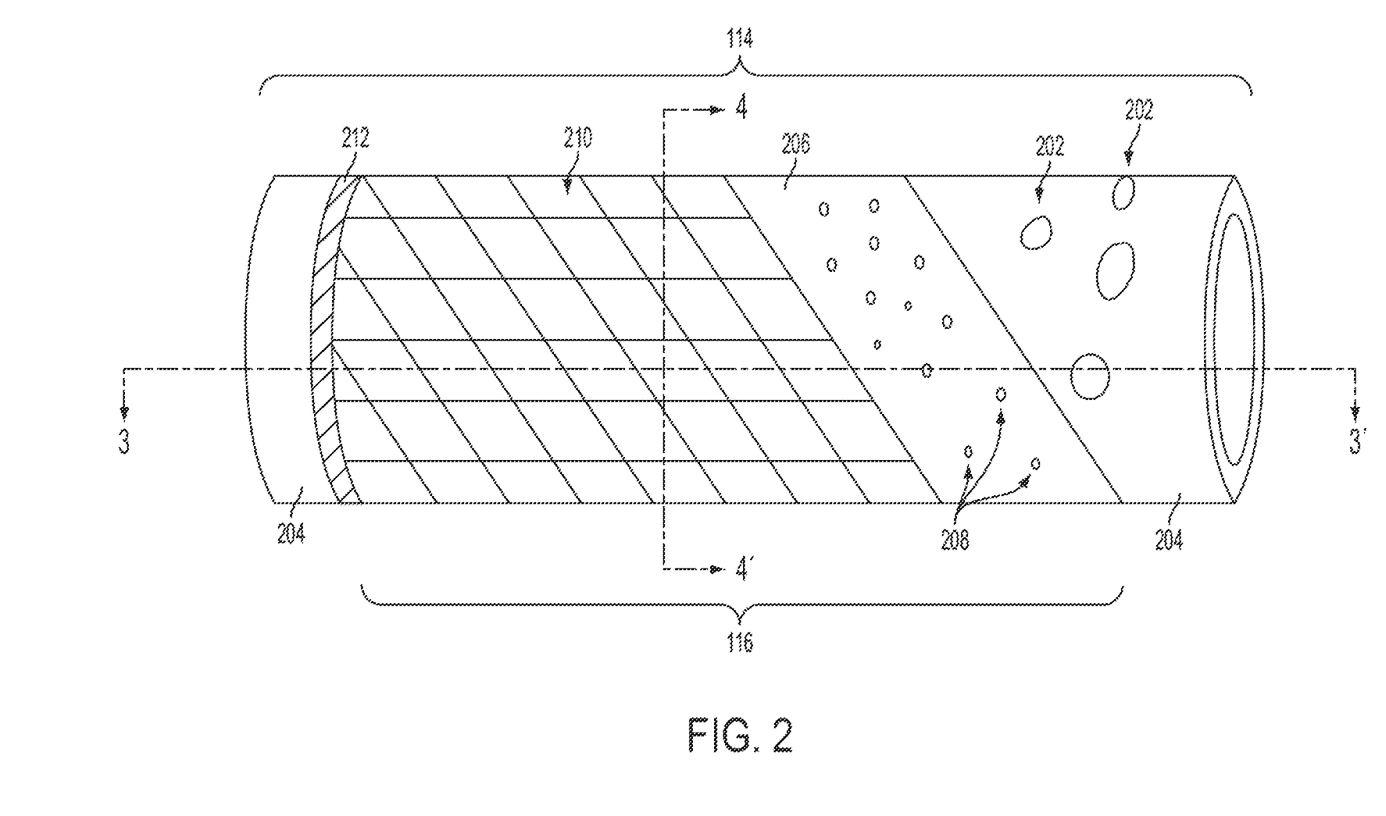
FIG. 2 is a partial perspective view of a section of a tubing string having a porous medium screen according to one embodiment of the present invention.

FIG. 2 is a partial perspective view of a section of a tubing section 114 of a tubing string 112 having a porous medium screen 116. The partial perspective view of the tubing section 114 is partially cut away to depict a first layer of the porous medium screen 116 that includes a porous medium 206 circumferentially surrounding a body 202 of the tubing section 114 and a second layer of the porous medium screen 116 that includes a shroud 210 of a retaining structure circumferentially surrounding the porous medium 206.

The tubing section 114 can include one or more openings 202 in the body 204 of the tubing section 114. Production fluid produced from the subterranean formation 110 can enter the body 204 via the openings 202. Examples of the openings 202 can include (but are not limited to) perforations or slots in the body 204 of the tubing section 114.

The production fluid can be filtered by the porous medium screen 116. Although FIG. 2 depicts the openings 202 as exposed, a tubing section 114 can be deployed with the porous medium screen 116 circumferentially surrounding the tubing section 114 such that the porous medium screen 116 is positioned between the subterranean formation 110 and the openings 202 of the body 204 of the tubing section 114.

The porous medium screen 116 can include the porous medium 206 and a retaining structure. The porous medium 206 can filter the production fluid. The retaining structure can include any device, structure, or group of devices and/or structures adapted to couple the porous medium 206 to the tubing section 114 or to otherwise retain the porous medium 206 in a position between the openings 202 and the subterranean formation 110. As depicted in FIG. 2, an example of a retaining structure can include a shroud 210 and a stopper 212. In some embodiments, the retaining structure can be configured to be attached or otherwise coupled to the tubing section 114 such that the retaining structure, such as the shroud 210 and the stopper 212, cannot be removed from the tubing section 114 installed in a well system 100.

The porous medium 206 can be any suitable medium having pores 208. The porous medium 206 can be, for example, a cellular structure that includes a solid material containing a series of interconnected pores forming a series of channels through the porous medium 206. The porous medium 206 can be manufactured or otherwise such that the pores 208 are adapted to allow a fluid to flow through the porous medium 206 and to prevent particles from moving through the porous medium 206. Examples of a porous medium 206 can include (but are not limited to) a carbon foam, a silicone foam, a metal foam, a polyester foam, a polyurethane foam, an epoxy having dissolvable porous medium 206, a silicon carbon foam, etc.

The porosity and average pore size of a porous medium 206 can be varied based on the particle size of particulate material from the subterranean formation 110. The porous medium 206 can also be selected and/or manufactured such that the porosity and average pore size of the pores 208 prevent or obstruct particles in the production fluid from moving through the porous medium 206. For example, a production fluid from a subterranean formation may include particles, such as sand particles, having a diameter between 0.0625 millimeters and 2 millimeters. A suitable porous medium 206 can be selected and/or manufactured such that the porous medium 206 has pores 208 with a pore size of less than 0.0625 millimeters in diameter, such as 0.0500 millimeters. The porous medium 206 can also be selected or manufactures such that the pores 208 have a porosity and average pore size allowing fluid with the viscosity of the production fluid from the subterranean formation 110 to flow through the porous medium 206.

The shroud 210 can protect the porous medium 206 during deployment of the tubing section 114 and can prevent the porous medium 206 from expanding in a radial direction. The shroud 210 can also protect the porous medium 206 coupled to a tubing section 114 being moved or otherwise manipulated in a wellbore system. Protecting the porous medium 206 can include preventing damage to the porous medium during insertion of the tubing section 114 into the wellbore 102. For example, a tubing section 114 being deployed into a wellbore 102 can encounter ledges or other restrictions in the subterranean formation 110. The shroud 210 can prevent the ledges or other restrictions from contacting the porous medium 206 and damaging the porous medium 206. The shroud 210 can be a solid material having openings allowing fluid and particles to flow through the shroud 210. For example, the shroud 210 can include a net structure manufactured from a metal or other suitable material. The shroud 210 can also prevent radial expansion of the porous medium 206 coupled to a tubing section 114 installed in an operational well system 100.

The retaining structure can also include a stopper 212. The stopper 212 can be adapted to circumferentially surround the tubing section 114. The stopper 212 can prevent the porous medium 206 from expanding in an direction. The stopper 212 can be, for example, a ring. The stopper 212 can be formed using any suitable material, such as a non-permeable and rigid or semi-rigid material. Examples of suitable materials include, but are not limited to, rubber, metal, plastic, etc. Although the partial perspective view of FIG. 2 depicts a single stopper 212 at a single edge of the porous medium 206, a stopper can be positioned at each edge of the porous medium 206.

Although FIG. 2 depicts a porous medium screen 116 having a retaining structure with a shroud 210 and a stopper 212, other embodiments can be used. In some embodiments, a porous medium 206 can be sufficiently durable and rigid that a shroud 210 for protecting the porous medium 206 and preventing radial expansion of the porous medium can be omitted. In other embodiments, a porous medium 206 can be coupled to the tubing section 114 via adhesion, such as using an adhesive material or via an adhesive property of the porous medium itself. In other embodiments, a porous medium 206 coupled to the tubing section 114 via adhesion can omit either or both of the shroud 210 or the stopper 212.

Figure 3:
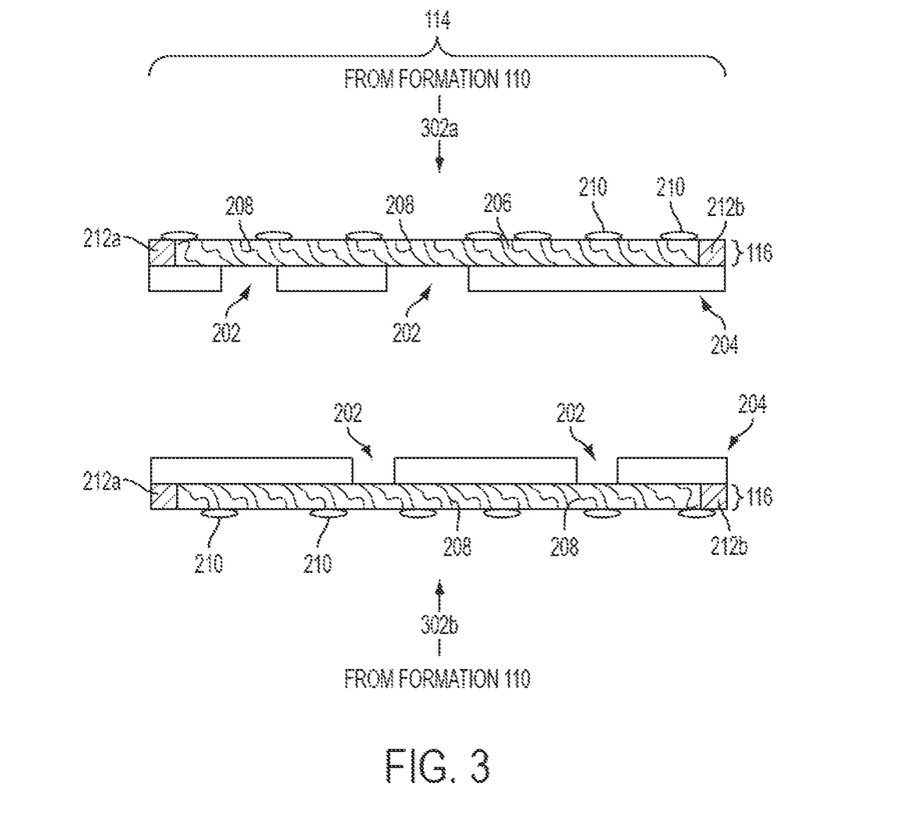
FIG. 3 is a longitudinal cross-sectional view of a section of a tubing string having a porous medium screen according to one embodiment of the present invention.
Figure 4:
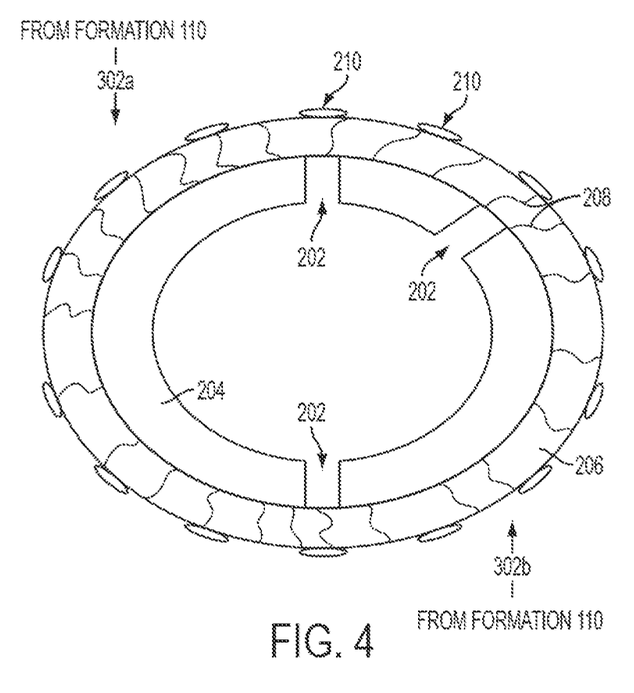
FIG. 4 is a lateral cross-sectional view of a section of a tubing string having a porous medium screen according to one embodiment of the present invention.

FIG. 3 depicts a longitudinal cross-sectional view of the tubing section 114 having the porous medium screen 116 taken along the line 3-3' of FIG. 2. The direction of fluid flow from subterranean formation 110 is depicted by arrows 302a, 302b. The retaining structure of the porous medium screen 116 can include the stoppers 212a, 212b. FIG. 4 depicts a lateral cross-sectional view of the tubing section 114 having the porous medium screen 116 taken along the line 4-4' of FIG. 2.

Production fluid can flow from the subterranean formation 110 through the pores 208 of the porous medium 206. Particles in the production fluid can be prevented from passing through the porous medium, thereby filtering such particles from the production fluid. Production fluid can exit the pores of the porous medium 206 and enter the body 204 of the tubing section 114 via the openings 202.

Although the pores 208 of the porous medium screen 116 are depicted in FIG. 3 as channels from a first side of the porous medium 206 to another side of the porous medium 206, any series of interconnecting pores forming a series of channels through the porous medium 206 can be used.

Figure 5:
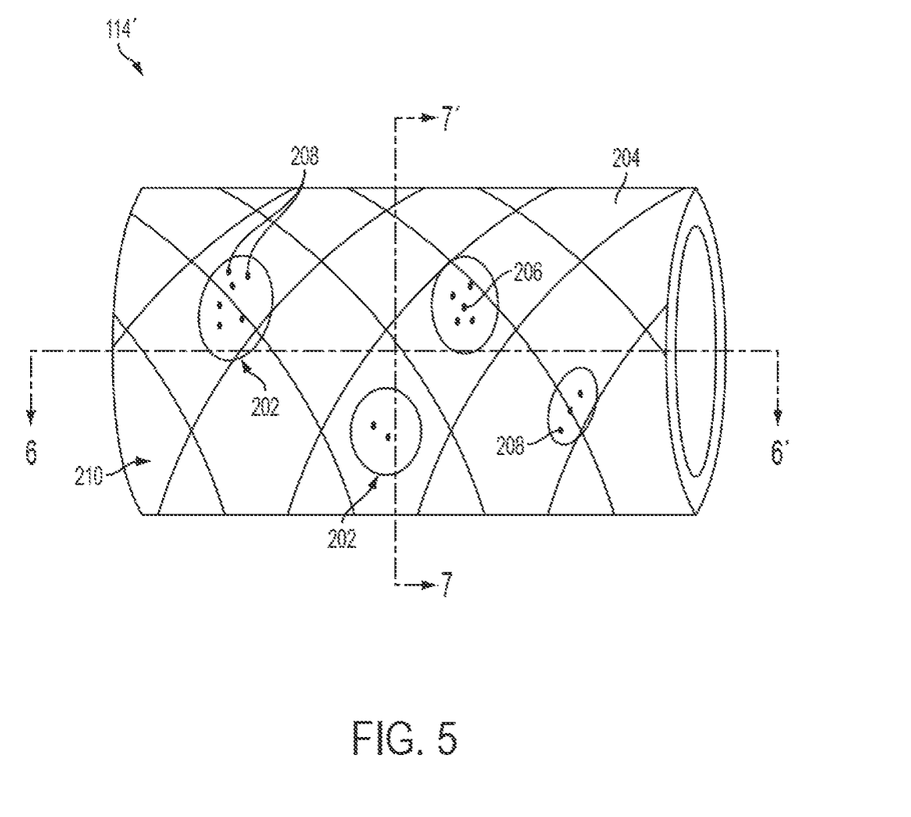
FIG. 5 is a perspective view of a section of a tubing string having a porous medium within openings of the section of the tubing string according to one embodiment of the present invention.
Figure 6:
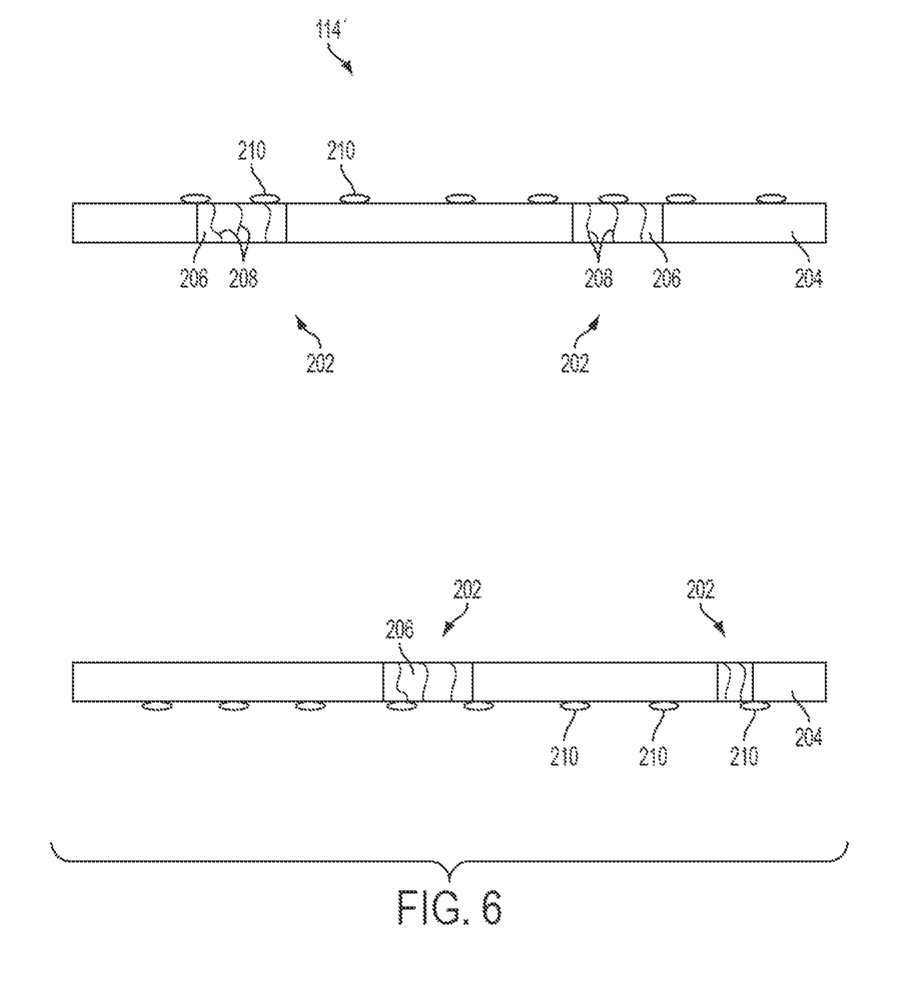
FIG. 6 is a longitudinal cross-sectional view of a section of a tubing string having a porous medium within openings of the section of the tubing string according to one embodiment of the present invention.
Figure 7:
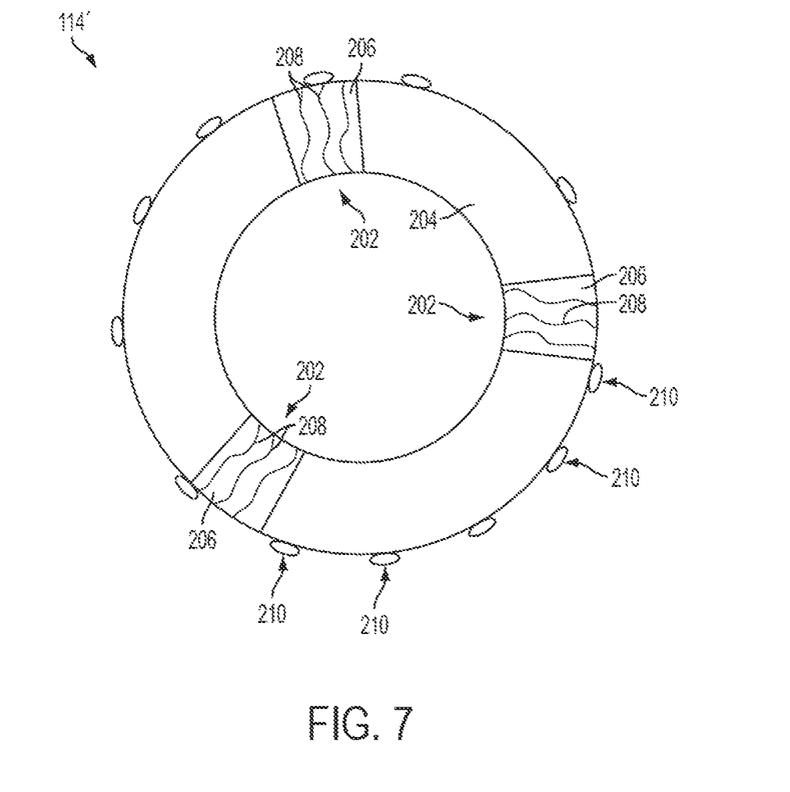
FIG. 7 is a lateral cross-sectional view of a section of a tubing string having a porous medium within openings of the section of the tubing string according to one embodiment of the present invention.

Although FIGS. 2-4 depict a porous medium 206 circumferentially surrounding a tubing section 114, other implementations are possible. For example, FIGS. 5-7 depict a tubing section 114' of a tubing string 112 having a porous medium 206 within openings 202 of the tubing section 114'. FIG. 5 is a perspective view of the tubing section 114'. FIG. 6 is a longitudinal cross-sectional view of the tubing section 114' taken along the line 6-6' of FIG. 5. FIG. 7 is a lateral cross-sectional view of the tubing section 114' taken along the line 7-7' of FIG. 5.

As depicted in FIGS. 5-7, the porous medium 206 is located within each of the openings 202 in the body 204 of the tubing section 114.' The tubing section 114' can also include a shroud 210 circumferentially surrounding the tubing section 114.' The flow of fluid from the subterranean formation 110 can be similar to that depicted in FIGS. 3-4. The shroud 210 depicted in FIGS. 5-7 can protect the porous medium 206. In other embodiments, the shroud 210 can be omitted.

Figure 8:
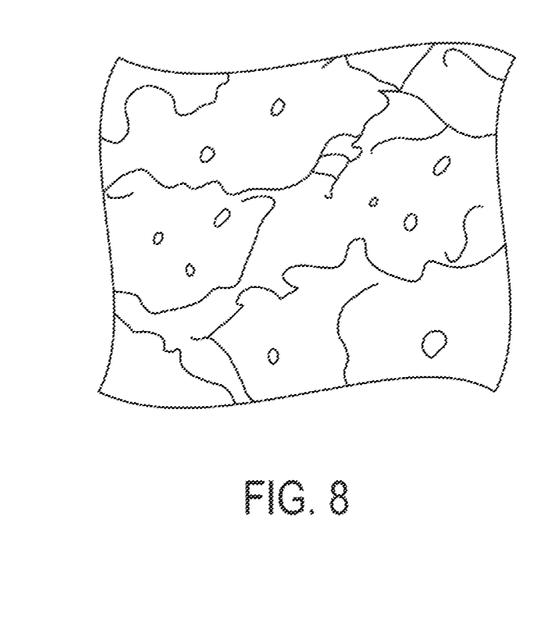
FIG. 8 depicts carbon foam that can be used as a porous medium for a porous medium screen according to one embodiment of the present invention.
Figure 9:
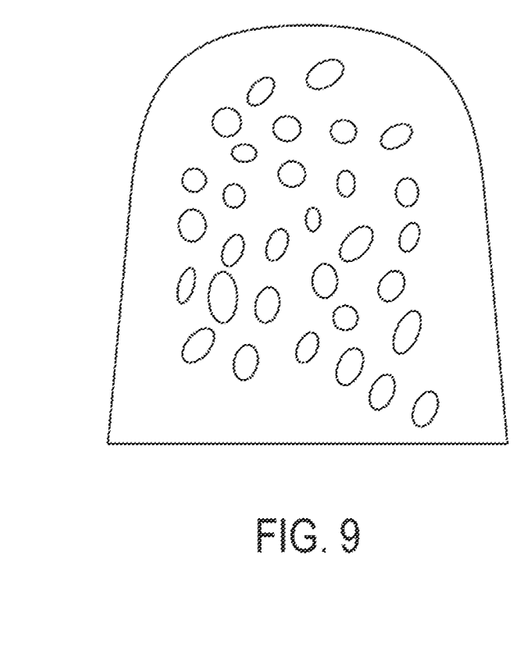
FIG. 9 depicts a silicon carbide foam that can be used as a porous medium for a porous medium screen according to one embodiment of the present invention.

FIGS. 8 and 9 depict examples of porous foams that can be used in a porous medium screen, such as a carbon foam depicted in FIG. 8 and a silicon carbide foam having pores depicted in FIG. 9 Although FIGS. 8 and 9 depict examples of porous media, any porous medium having a suitable porosity and/or pore size can be used.

The foregoing description of the embodiments, including illustrated embodiments, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

The invention claimed is:

1. A production tubing system comprising:
a section of a tubing string configured to be disposed in a wellbore through a fluid-producing formation, the section comprising a body defining a plurality of openings;
a porous medium positioned within the plurality of openings, the porous medium comprising a porous foam having one or more pores adapted to allow a fluid to flow through the porous medium and to prevent one or more particles from flowing through the porous medium; and
a retaining structure adapted to allow the fluid to flow from the fluid-producing formation to the porous medium and to prevent radial expansion of the porous medium.

2. The production tubing system of claim 1, wherein the porous foam comprises a continuous material and wherein each of the one or more pores comprises empty space within the continuous material.

3. The production tubing system of claim 1, wherein the retaining structure comprises a shroud adapted to circumferentially surround the porous medium, the shroud comprising a plurality of strands, each of the plurality of strands adapted to be coupled to at least another one of the plurality of strands, each of the plurality of strands comprising a non-permeable material.

4. The production tubing system of claim 1, wherein the porous medium comprises a carbon foam.

5. The production tubing system of claim 1, wherein the porous medium comprises a silicone foam.

6. The production tubing system of claim 1, wherein the porous medium comprises a metal foam.

7. The production tubing system of claim 1, wherein the porous medium comprises at least one of a polyester foam and a polyurethane foam.

* * * * *

UNITED STATES PATENT AND TRADEMARK OFFICE
CERTIFICATE OF CORRECTION

| | | |
|---|---|---|
| PATENT NO. | : 9,174,151 B2 | Page 1 of 1 |
| APPLICATION NO. | : 14/016479 | |
| DATED | : November 3, 2015 | |
| INVENTOR(S) | : Jean-Marc Lopez et al. | |

It is certified that error appears in the above-identified patent and that said Letters Patent is hereby corrected as shown below:

On Title page 2, in column 2, under "Other Publications", line 5, delete "13/994,03" and insert -- 13/994,030 --, therefor.

Signed and Sealed this
Third Day of May, 2016

Michelle K. Lee
*Director of the United States Patent and Trademark Office*